May 15, 1934.    G. B. READ    1,959,108
FERTILIZER DISTRIBUTOR
Filed Feb. 15, 1932
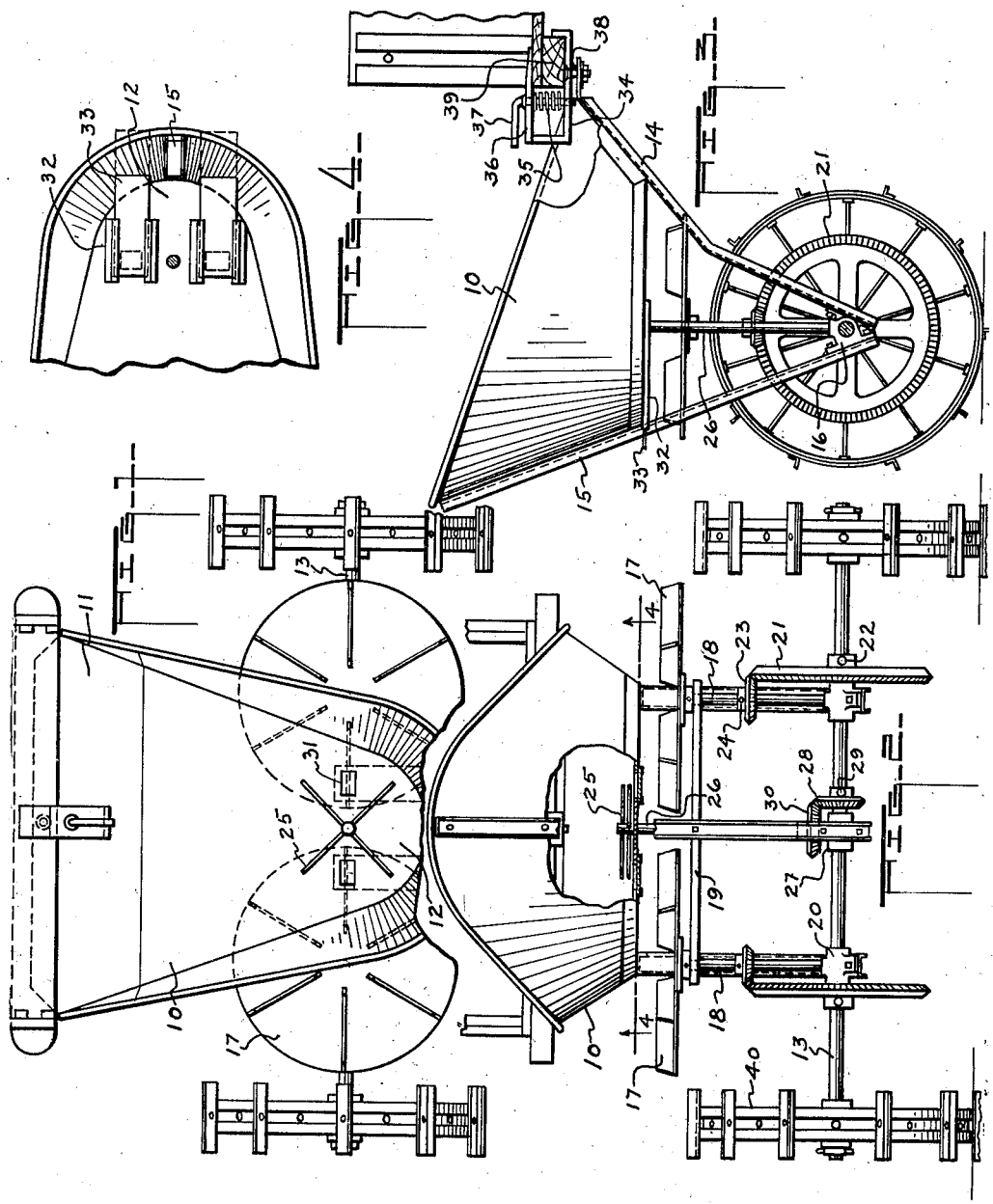
INVENTOR
George B. Read
PER
Tefft & Tefft
ATTYS.

Patented May 15, 1934

1,959,108

UNITED STATES PATENT OFFICE 1,959,108

FERTILIZER DISTRIBUTOR

George B. Read, Bloomington, Ill.

Application February 15, 1932, Serial No. 593,140

1 Claim. (Cl. 275—8)

This invention relates to fertilizer or lime spreaders.

One of the objects of the invention lies in the provision of a lime or fertilizer spreader which is capable of ready attachment to the rear end of an auto truck or the wagon box of an ordinary farm wagon.

Another object lies in the provision of a two wheel spreader capable of quick detachable connection to the rear end of a farm wagon or truck, the spreader having a pivotal attachment which permits it to track directly behind the farm wagon, irrespective of the turning movement thereof.

Another object lies in the provision of a detachable lime or fertilizer spreader capable of detachable relationship with a farm wagon or truck, said spreader having a material receiving hopper with a movable stirring or agitating member therein to prevent any clogging or massing of the material within the hopper, irrespective of the wet or dry condition thereof, such member also insuring direct feed to the distributing fans.

A further object lies in the provision of a detachable lime or fertilizer spreader unit, said member being of the two wheel type and providing positive feed to the distributing fans, there also being provided a manually adjustable feature for controlling the amount of material deposited upon the fan units.

Other objects will appear in the following specification, taken in connection with the annexed drawing, in which—

Fig. 1 is a plan view of my detachable lime or fertilizer spreader unit;

Fig. 2 is an end elevation, a portion thereof being broken away for a more detail showing of the material stirring mechanism;

Fig. 3 is a side elevational view, the same including a detail showing of the quick detachable mechanism; and Fig. 4 is a fragmentary showing of the manually adjustable feed mechanism.

Before referring specifically to the drawing, it might be stated that the present lime or fertilizer spreader is a device which overcomes certain disadvantages of the larger and more expensive types of distributing mechanism. The patent art and trade show in many instances both vehicles having fertilizer distributing mechanism in connection therewith and also spreaders of the end-gate type. Applicant provides a novel character of spreader which can be constructed at a minimum cost, the device being capable of quick detachment from the rear end of an ordinary farm wagon or truck. In using a spreader of this type, the operator can leave the spreader unit in a field while he returns with his ordinary farm wagon or truck to the main lime or fertilizer supply. In ordinary usage, this spreader is of the two wheel type and when left in the field the operator merely places his shovel or other brace beneath the forward end for the purpose of supporting same in an upright position ready for subsequent attachment to the wagon, which of course carries the bulk of the fertilizer which is to be spread. This device, as will later appear, is so connected to the wagon as to track therewith, irrespective of the turning movement thereof. Such connection permits the wagon to be maneuvered without any drag due to its association with the spreader.

Further, applicant has provided a device of a two wheel character which by the movement of said wheels supplies the power for the spreading and material delivering mechanism. Due to the particular fashioning of the unit with the continuously operating stirring or agitating members, there can be no possible clogging of the fertilizer material and an even feed to the distributing fan is insured.

A device of this character fills a long felt want upon the farm in that the device is so readily handled by a single operator. It has not the disadvantages of the very heavy end gate seeders which must necessarily be elevated considerably for placement upon the rear of a wagon. Further, it can be constructed at a minimum of expense, and therefore obviates the necessity of a large monetary outlay for a wagon type of fertilizer distributor.

Referring specifically to the drawing, in the various figures is shown a fertilizer hopper 10 which is arranged with a receiving wider portion 11 and a delivery sump 12. The hopper is supported upon a moving axle 13 by means of the front and rear braces 14 and 15 respectively. These braces have supporting bearing portions 16 upon the axle 13. Disposed immediately beneath the hopper 10 are dual distributing fans 17, which are supported upon the upper end of and driven by the two vertically disposed drive shafts 18. These shafts are supported at their upper end by a cross bar 19 connected to the braces 14 and 15, the lower ends of said vertical shafts being contained and rotatably supported in the dual bearing portions 20 bracketed upon the axle 13.

Means for driving the shafts 18, which in turn carry the fertilizer distributing fans, is provided in the gears 21 keyed as at 22 to the axle 13. These gears 21 are in mesh with pinions 23 keyed as at 24 to the shafts 18. Disposed in the sump 12 of the fertilizer hopper are plural stirring or agitating members 25. These laterally projecting arms, when rotating in the sump, break up any clogged or massed material, thereby insuring an even feed to the distributing fan, irrespective of the condition of the fertilizer.

Means for driving the agitators 25 is provided in the vertically disposed drive shaft 26, the lower end of which is carried in a supporting bracket 27 carried on the axle 13. Means for driving said vertical shaft is provided in the following gear mechanism, which includes gear 28 keyed to the axle 13 at 29. This gear drives pinion 30 which in turn is secured to the vertical shaft 26.

Rotation of the axle obviously creates activity of the stirring member 25 through the above described gear mechanism.

Dual feed openings or slots 31 are found in the sump 12 of the fertilizer hopper, these apertures being disposed immediately beneath the agitators 25. Manually operated means is provided for varying the size of the feed openings. This mechanism includes plural guide members 32, which are adapted to receive the dual plates 33 in a frictional manner therein. The guides 32 and plates 33 are disposed beneath the hopper and are so formed as to permit manual movement of the plates 33 to vary the size of the feed slots.

By viewing Fig. 3, it becomes readily apparent that the operator merely grasps the projecting ends of the plates 33 and moves them inwardly or outwardly, as the case may be, to control the amount of fertilizer that is fed to the rotating fan 17.

Means for attaching applicant's fertilizer distributor to the rear end of a wagon is provided in the following mechanism. A lower clamping portion 34 has secured thereto in a tensioned manner by virtue of the coil spring 35, an upper clamping portion 36, the handle 37 operating obviously either to maintain said members in a clamped position or to permit the release thereof. The clamp in itself is conventional in design; however, it will be noted that the lower clamping portion 34 is pivotally connected in a loose manner as at 38 with the receiving end of the hopper 10. In other words, the distributor, although held in a clamped position upon the rear end 39 of the conventional farm wagon, nevertheless, by virtue of this pivotal connection is able to follow directly behind the wagon and to move therewith, irrespective of the turning movement of the wagon, as well as the character of the ground surface. Therefore, there is provided a fertilizer distributor so connected to the rear end of the wagon that it is not forcibly dragged behind the wagon but is capable of following directly behind the wagon.

Conventional traction wheels 40 are shown secured to the axle 13, the same providing the power element for the axle, which in turn transmits power to the various driving portions.

As far as the operation of my fertilizer distributor is concerned, it is apparent that this device may be readily clamped to the rear end of the conventional farm wagon and utilized as a means for receiving fertilizer shoveled thereinto by an operator standing in the vehicle while it is being driven through the fields. When the supply of fertilizer in the vehicle has been exhausted, the operator, rather than drag the distributor back to the source of supply, which may be at some considerable distance, merely unclamps the device from the rear end of the vehicle and disposes either a shovel or a supporting member beneath the receiving end of the hopper in order that the distributor may be maintained in an upright position. When the operator has returned with the wagon again filled with fertilizer, he then quickly attaches the fertilizer spreader to the rear end of the vehicle and continues his fertilizer spreading operation.

As previously explained, the spreader, although securely clamped to the rear end of the wagon, nevertheless tracks directly therebehind, due to the pivotal clamped connection. Further, it is quite apparent that the traction wheels provide power for the various gear mechanisms which in turn rotate the spreading fan 17 and the stirring or agitating members 25 disposed in the sump of the hopper. These laterally projecting rods 25, due to their rotational movement, agitate the fertilizer at a point immediately adjacent the feed openings, thus preventing any massing of the material and insuring an even feed to the distributor fans. These fans are rotating at a considerable speed and obviously project the fertilizer fed thereon over a considerable area. There has also been provided manually operating means for varying the size of the feed openings, thus controlling the amount of fertilizer used.

It will also be noted that by virtue of the pivotal connection 38 between the spreader and clamp the spreader will accommodate itself to any character of ground surface area. Such pivotal connection permits tipping of the spreader with respect to the clamp and wagon and does not interfere in any way with the natural tendency of the spreader to follow immediately behind the wagon or truck.

What I claim is:

A fertilizer spreader including in combination an axle, traction wheels therefor, a fertilizer hopper supported upon said axle, said hopper having a substantially flat bottom, an agitator member disposed above and adjacent said flat hopper bottom and adapted to be rotated in plane parallel therewith by means of an individual geared connection with said axle, adjustable openings in said hopper bottom so disposed as to be approximately included within the sweep of said agitator, distributing fans disposed below and adjacent said bottom in such position that the aforementioned adjustable openings are included within the sweep of said distributing fans, said fans adapted to be rotated in plane approximately parallel to said hopper bottom by means of individual geared connections with said axle.

GEORGE B. READ.